US011227227B2

(12) United States Patent
Goldschmidt et al.

(10) Patent No.: US 11,227,227 B2
(45) Date of Patent: Jan. 18, 2022

(54) AUTOMATIC DETECTION OF ANOMALIES IN GRAPHS

(71) Applicant: International Business Machines Corporation, Armonk, NY (US)

(72) Inventors: Yaara Goldschmidt, Kiryat Ono (IL); Ofer Lavi, Tel Aviv (IL); Matan Yitshak Ninio, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 926 days.

(21) Appl. No.: 15/973,581

(22) Filed: May 8, 2018

(65) Prior Publication Data
US 2018/0357555 A1    Dec. 13, 2018

Related U.S. Application Data

(63) Continuation of application No. 14/839,981, filed on Aug. 30, 2015, now abandoned.

(51) Int. Cl.
*G06N 7/00* (2006.01)
*G06N 20/00* (2019.01)
*G06F 16/901* (2019.01)

(52) U.S. Cl.
CPC ......... *G06N 7/005* (2013.01); *G06F 16/9024* (2019.01); *G06F 16/9027* (2019.01); *G06N 20/00* (2019.01)

(58) Field of Classification Search
CPC .. G06N 99/005; G06N 7/005; G06F 16/9024; G06F 16/9027; G06F 21/56; G06F 21/566; G06F 17/30823; G06F 17/30858
See application file for complete search history.

(56) References Cited

U.S. PATENT DOCUMENTS

| | | | |
|---|---|---|---|
| 6,735,703 B1 | 5/2004 | Kilpatrick et al. |
| 6,889,218 B1 | 5/2005 | Nassehi |
| 7,096,421 B2 | 8/2006 | Lou |
| 7,437,664 B2 | 10/2008 | Borson |
| 7,926,049 B1 | 4/2011 | Kumar |

(Continued)

OTHER PUBLICATIONS

Wang et al. "Optimizing Multi-Graph Learning: Towards a Unified Video Annotation Scheme", MM, 2007, pp. 10.*

(Continued)

*Primary Examiner* — Li Wu Chang
(74) *Attorney, Agent, or Firm* — Ziv Glazberg

(57) ABSTRACT

A method, apparatus and product for automatic detection of anomalies in graphs. The method comprising obtaining training data, the training data comprising a plurality of graphs, each defined by nodes and edges connecting between the nodes, at least some of the nodes are labeled; determining a statistical model of a graph in accordance with the training data, the statistical model takes into account at least one structured and labeled feature of the graph, wherein the structured and labeled feature of the graph is defined based on a connection between a plurality of nodes and based on at least a portion of the labels of the plurality of nodes; obtaining an examined graph; and determining a score of the examined graph indicative of a similarity between the examined graph and the training data, wherein the score is based on a value of the structured and labeled feature in the examined graph.

10 Claims, 5 Drawing Sheets

(56) References Cited

U.S. PATENT DOCUMENTS

| | | | |
|---|---|---|---|
| 7,966,602 | B1 | 6/2011 | Webster et al. |
| 8,019,987 | B2 | 9/2011 | Sabato et al. |
| 8,140,301 | B2 | 3/2012 | Abe et al. |
| 8,306,943 | B2 | 11/2012 | Yepremyan et al. |
| 2006/0028471 | A1* | 2/2006 | Kincaid ................ G06T 11/206 345/440 |
| 2006/0161575 | A1 | 7/2006 | Fan et al. |
| 2009/0187585 | A1 | 7/2009 | Mathur et al. |
| 2009/0281981 | A1* | 11/2009 | Chen ..................... G06N 20/20 706/56 |
| 2012/0035777 | A1 | 2/2012 | Park |
| 2013/0326625 | A1* | 12/2013 | Anderson ............. G06F 21/566 726/23 |
| 2014/0280224 | A1* | 9/2014 | Feinberg ............. G06F 16/9024 707/748 |

OTHER PUBLICATIONS

Chandola et al., "Anomaly Detection: A Survey", ACM Computing Surveys, vol. 4, Issue 3, Article 15, Jul. 2009.
Rao et al., "Implementation of Anomaly Detection Technique Using Machine Learning Algorithms.", International Journal of Computer Science and Telecommunications, vol. 2, Issue 3, Jun. 2011.
Ahmed et al., "Machine Learning Approaches to Network Anomaly Detection", SYSML 2007, Proceedings of the 2nd USENIX workshop on Tackling computer systems problems with machine learning techniques, Article No. 7, 2007.

* cited by examiner

AUTOMATIC DETECTION OF ANOMALIES IN GRAPHS

CROSS-REFERENCE TO RELATED APPLICATIONS

This application is a continuation and claims the benefit of U.S. non-provisional application Ser. No. 14/839,981 filed Aug. 30, 2015, which is a continuation and claims the benefit of U.S. non-provisional application Ser. No. 13/947,126 filed Jul. 22, 2013, both of which are hereby incorporated by reference in their entirety without giving rise to disavowment.

TECHNICAL FIELD

The present disclosure relates to machine learning in general, and to automatic detection of irregular data, in particular.

BACKGROUND

In a computerized environment, data may be provided in a form of a graph. A graph is a set of nodes and edges. Each edge connects at least two nodes of the graph. The graph may be labeled, such as by providing a label for each node of the graph.

One note worthy sub-class of the graph data structure is a tree. A tree is a graph that does not contain any loops. One node in the tree is deemed as the root node from which the tree is seen as starting. Each node may have child nodes to which it is connected. A node having no child nodes is referred to as a terminal node or as a leaf. The tree is also characterized as not containing any loop.

Both trees and graphs contain structural information (also known as topology), indicating a relationship between different nodes. Data that is embodied in a graph or a tree may be expressed by the structure of the data structure itself.

BRIEF SUMMARY

One exemplary embodiment of the disclosed subject matter is a computer-implemented method comprising: obtaining training data, the training data comprising a plurality of graphs, each defined by nodes and edges connecting between the nodes, wherein at least some of the nodes are labeled; determining, by a processor, a statistical model of a graph in accordance with the training data, the statistical model takes into account at least one structured and labeled feature of the graph, wherein the structured and labeled feature of the graph is defined based on a connection between a plurality of nodes and based on at least a portion of the labels of the plurality of nodes; obtaining an examined graph; and determining, by the processor, a score of the examined graph indicative of a similarity between the examined graph and the training data, wherein the score is based on a value of the structured and labeled feature in the examined graph.

Another exemplary embodiment of the disclosed subject matter is a computerized apparatus having a processor, the processor being adapted to perform the steps of: obtaining training data, the training data comprising a plurality of graphs, each defined by nodes and edges connecting between the nodes, wherein at least some of the nodes are labeled; determining a statistical model of a graph in accordance with the training data, the statistical model takes into account at least one structured and labeled feature of the graph, wherein the structured and labeled feature of the graph is defined based on a connection between a plurality of nodes and based on at least a portion of the labels of the plurality of nodes; obtaining an examined graph; and determining a score of the examined graph indicative of a similarity between the examined graph and the training data, wherein the score is based on a value of the structured and labeled feature in the examined graph.

Yet another exemplary embodiment of the disclosed subject matter is a computer program product comprising a non-transitory computer readable medium retaining program instructions, which instructions when read by a processor, cause the processor to perform a method comprising: obtaining training data, the training data comprising a plurality of graphs, each defined by nodes and edges connecting between the nodes, wherein at least some of the nodes are labeled; determining a statistical model of a graph in accordance with the training data, the statistical model takes into account at least one structured and labeled feature of the graph, wherein the structured and labeled feature of the graph is defined based on a connection between a plurality of nodes and based on at least a portion of the labels of the plurality of nodes; obtaining an examined graph; and determining a score of the examined graph indicative of a similarity between the examined graph and the training data, wherein the score is based on a value of the structured and labeled feature in the examined graph.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
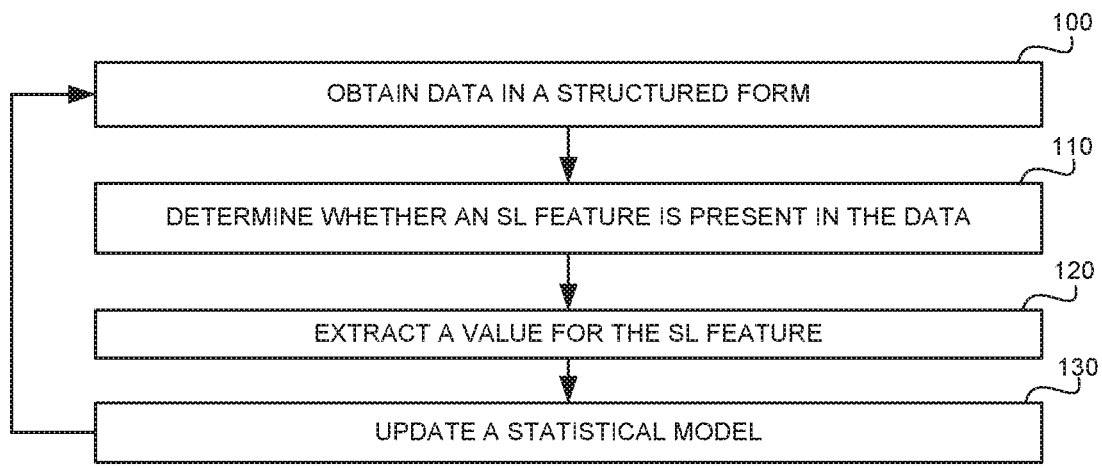
FIG. 1A shows a flowchart diagram of a method, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the present disclosure a "graph" is a data structure comprised of nodes and edges connecting between the nodes. The graph may be labeled by associating labels to nodes or edges.

In the present disclosure a "motif" is a non-labeled sub-graph of a labeled graph. In some exemplary embodiments, the motif may be embodied a plurality of times by different portions of the graph, each embodiment is associated with a different nodes having the same topological structure as the motif. In some exemplary embodiments, the same node may participate in more than one motif. As an example, a motif may be a clique of n nodes. Additionally or alternatively, a motif may be a cycle of m nodes. Additionally or alternatively, a motif may be a tree having a root node and two child nodes, each of which having a single child node. Other motifs may include any number of nodes and may define any structural relationship therebetween.

One technical problem dealt with by the disclosed subject matter is to detect data elements which deviate from a norm, when the data elements are provided in a structured manner.

In many areas, it is desirable to detect data elements which deviate from the norm. Often, as in Big Data scenarios, when the amount of data is large, it is impossible or implausible to manually analyze all data or manually construct rules to find the elements which are abnormal. In these cases, it will be beneficial to use an automated method that will pinpoint these anomalies and raise them above the surface level.

In a wide range of areas, portions of the data are (or can be) represented in a structured manner. Structured data may be, for example, graphs or trees. Anomalies in structured data do not only refer to the labels of the nodes but rather also to the structure of the data itself (e.g., relationship between nodes, paths in the graph, motifs of the graph, or the like).

One technical solution is to extract a value of a Structured and Labeled (SL) feature from a graph. The SL feature may be a feature which is based on a topology, hierarchy, or similar relationship between nodes that is defined using edges. The SL feature may also be based on at least one label of the nodes or edges. The SL feature may be valued with a Boolean value indicating whether or not the SL feature exists in the graph (e.g., does the graph include a path having three nodes and starting with a label $L_1$ and ending with label $L_2$?). Additionally or alternatively, the SL feature may be valued with a value that is extracted from the graph (e.g., value that is taken from labels of the graph with respect to the feature location in the graph) thereby the SL feature not only indicates its existence in the graph but also a value that the graph defines for the SL feature. As an example, the SL feature may be existence of a path in the graph that is labeled with a specific set of labels. As another example, the SL feature may be a motif, a sub-tree, a sub-graph, or a similar element, within the graph. A value of such a feature may be a set of values of labels associated with the element. Additionally or alternatively, the SL feature may be indicative to an existence of a labeled sub-graph. As yet another example, the SL feature may be feature for the terminal value of a labeled path (e.g., labels in the path excluding the label of the terminal path). Such a feature may be, for example, a categorical feature, a nominal feature, an ordinal feature, or the like. Yet another example of an SL feature is a path from the root that ends with two leaves and the root's son has no brothers; The length of the path may be arbitrary.

Another technical solution is to obtain a plurality of graphs and based thereon to define a reference model—a consensus graph. The consensus graph may be a representation useful in determining an estimated graph based on the plurality of graphs and identifying a degree of difference between another graph and the plurality of graphs.

In some exemplary embodiments, a corpus of the structured data, presented in the form of graphs, is obtained and used to model a reference model. The reference model is based on extracting values relating to one or more features from each data sample. At least one of the features is an SL feature. Once a graph is obtained to be compared with the corpus, the values of the features are extracted for the graph and used to compare with the reference model. In some exemplary embodiments, the reference model is represented using a data structure in the form of a graph. In some exemplary embodiments, the reference model may be traversed in accordance with the traversal of the graph. In some exemplary embodiments, the reference model may be used to limit the search space of extracted features.

In some exemplary embodiments, the reference model may be used to store distributions of values over the features by accumulating information such as, but not limited to: the number of appearances of each value for each feature over all the training data, the number of appearances of pairs, triplets, or other n-wise combinations of values for more than one feature (also referred to as joint features), the number of appearances of values for features given a specific value of another feature, the number of appearances of values for features conditioned on values of other features. In some exemplary embodiments, information may be stored relating to a number of samples in which the feature appears (e.g., counting once even if the feature appears two or more times in a sample).

In some exemplary embodiments, based on the values of the features in the training dataset, a predictive model, such as a statistical model, may be defined. When a new graph is obtained, the values of its features may be extracted and the predictive model may be used to compute a score for each such value, wherein the score is indicative on how similar or dissimilar the value is from a prediction by the predictive model. The scores may be used to compute a single score for the graph, such as by aggregating the values, computing a weighted average, or the like.

In some exemplary embodiments, the disclosed subject matter may be utilized to provide a score to sub-graphs and aggregate them to a single score for the graph. In case the graph is a tree, sub-trees may be scored in an hierarchical manner and those scores may be aggregated to the root, producing a single score for the tree.

Referring now to FIG. 1A showing a flowchart diagram of a method to be performed in a training phase, in accordance with some exemplary embodiments of the disclosed subject matter.

In Step 100, data is obtained in structured form, such as a graph or a tree.

In Step 110, it is determined whether an SL feature is present in the data, and in case such a feature exists, its value is extracted in Step 120. In some exemplary embodiments, the data may include several occurrences of the feature, such as for example a plurality of labeled path. In such a case, each value may be extracted from the data.

In Step 130, a statistical model is updated based on the values of the SL feature. In case additional training data exist, Steps 100-130 may be performed with respect to such additional data. The statistical model may be created in any manner known in the art, such as but not limited to non-parametric or by parameter estimation based on statistical assumptions, or the like.

In some exemplary embodiments, a consensus graph may be constructed based on the values of the features, by including in the consensus graph each occurrence of the feature in an explicit or symbolic manner. As an example, with respect to a feature of a labeled path, each labeled path present in the training data may be introduced to the consensus graph. The consensus graph may also include a number of occurrences that each labeled path was observed and optionally all the observed alternative values and distribution thereof. In such an embodiment, steps 100-120 may be performed followed by a step during which the consensus graph is updated. Such steps may be performed iteratively over the training data. After the consensus graph is built, a statistical model may be determined based thereon.

It will be understood that the disclosed subject matter is not limited to the use of a single SL feature. Additional SL features may also be used. Additionally or alternatively, additional features that are not SL features, such as features that are associated with labels of the graph or features that are indifferent of the structure of the graph, may also be used. However, for the purpose of clarity, and without limiting the scope of the disclosed subject matter, Applicants focus on a single SL feature.

In some exemplary embodiments, the selection of features is assisted by the structure of the graph. For example, a joint feature may be selected based on features that relate to each other based on the structure of the graph. As an example, the joint feature may be a joint feature based on features that share a common ancestor up to k levels above the terminal value.

In some exemplary embodiments, updating (130) may not be performed iteratively. The method may iteratively perform steps 100-120 to collect all data into an occurrence matrix (e.g, sample X feature X value) and then process the whole matrix in batch to update or create the statistical model.

Figure 1B:
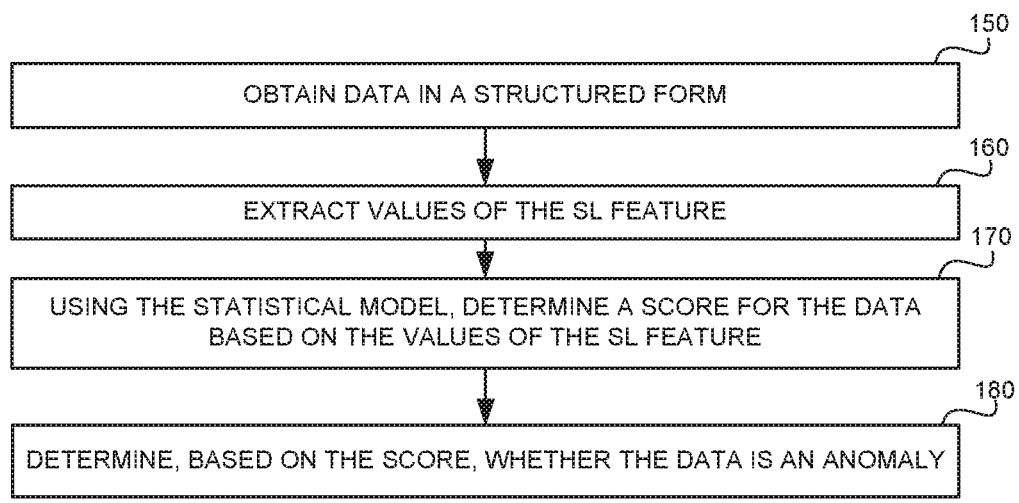
FIG. 1B shows a flowchart diagram of a method, in accordance with some exemplary embodiments of the disclosed subject matter.

Referring now to FIG. 1B showing a flowchart diagram of a method, in accordance with some exemplary embodiments of the disclosed subject matter. FIG. 1B may be performed after the training phase of FIG. 1A is performed.

In Step 150, data may be obtained. The data may be in structured form. The data that is obtained may be data to be compared with the corpus of training data obtained in FIG. 1A. The data may also be referred to as the "examined graph".

In Step 160, values of the SL feature are extracted from the examined graph.

In Step 170, the values of the SL features are compared to the statistical model determined in FIG. 1A to compute a score. The score may be, for example, a number between zero and one. In some exemplary embodiments, the score may be computed based on a plurality of scores, each associated with an observed value of the SL feature, and each indicative of a percentage of likelihood that the observed value would have been predicted by the statistical model.

In Step 180, based on the score, it may be determined whether the examined graph is considered as an anomaly. In some exemplary embodiments, in case the score is below a predetermined threshold, the examined graph is considered an anomaly. In some exemplary embodiments, an output may be provided to a user indicative whether s the examined graph is considered to be an anomaly. In some exemplary embodiments, only in case the examined graph is considered an anomaly, output is provided to the user. In some exemplary embodiments, results can be represented in an overview where the user can see in a glance whether and where are the areas in the graph that are abnormal, such as by using a visual indicator to indicate paths which deviate from the norm. As an example, a color of a path may be indicative of a score of the path with respect to the statistical model.

Referring now to FIG. 2A-2E showing illustrations of graphs and a consensus graph, in accordance with some exemplary embodiments of the disclosed subject matter. The graphs, which are part of a training dataset, are being shown on the left hand side of each figure, and the consensus graph is being shown on the right hand side. The figures exemplify a manner of building the consensus graph based on a training dataset. It would be noted that the figures relate to trees, however a similar approach may be applied to graphs. Additionally or alternatively, a spanning tree of a graph may be determined and used to allow reduction of the problem of determining a consensus graph based on plurality of graph into a problem of determining consensus tree based on a plurality of trees.

Figure 2A:
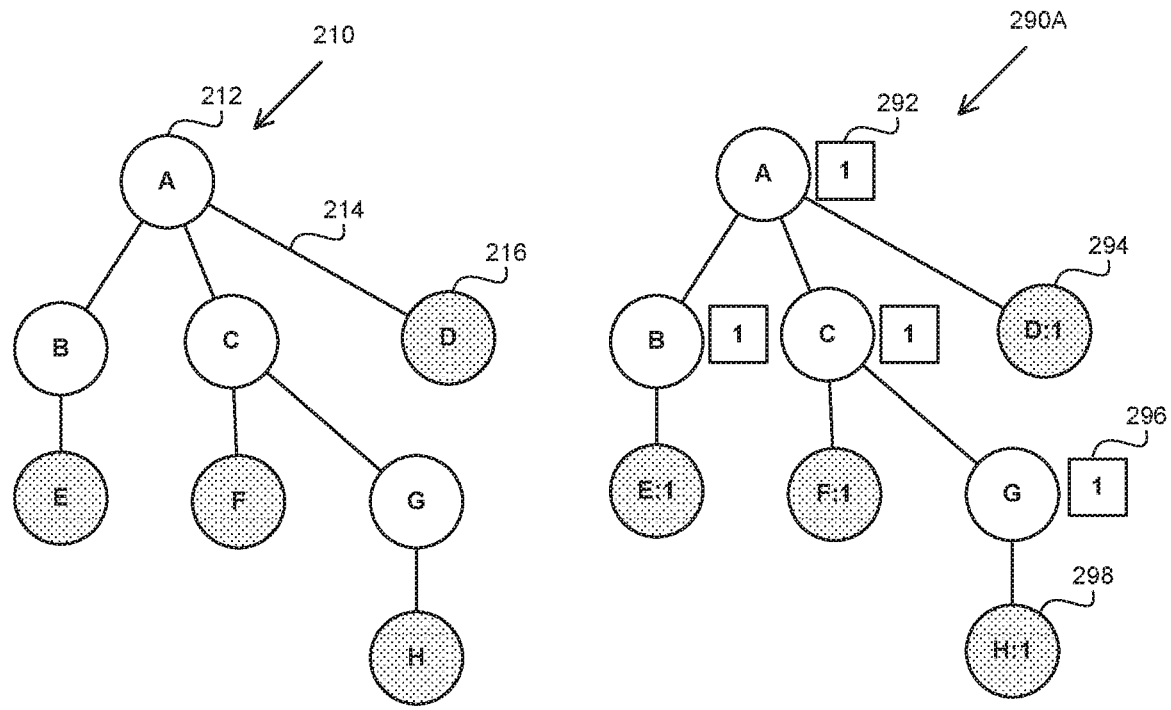
FIGS. 2A-2E show illustrations of graphs and a consensus graph, in accordance with some exemplary embodiments of the disclosed subject matter

In FIG. 2A, a Graph 210 is used to initialize a Consensus Graph 290A. Assuming that the SL feature is a labeled path and that a value of each SL feature is a terminal value of the path (e.g., a label of the last node in the path), Graph 210 contains several occurrences of the SL feature. Node A 212 is connected to Terminal Node D 216 by Edge 214 and define a labeled path A which has the value of D. Similarly, the path A-B has the value E, the path A-C has the value F, and the path A-C-G has the value H. Note that in this exemplary embodiment, the labeled path includes the labels of each nodes except for the terminal node. Also, a labeled path in this embodiment ends in a terminal node having no successor nodes (e.g., leaves in a tree).

Accordingly, Consensus Graph 290A includes the same paths. However, the consensus graph also comprises information relating to a number of times each SL feature occurrence was observed (Indication 292), and information relating to a number each value was observed. As an example Node 294 indicates that the path A was observed once with the value of D. Indication 292 indicates that the path A was observed once. Similarly, Indication 296 indicates the path A-C-G was observed once, and Node 298 indicates that the value H was observed once.

Figure 2B:
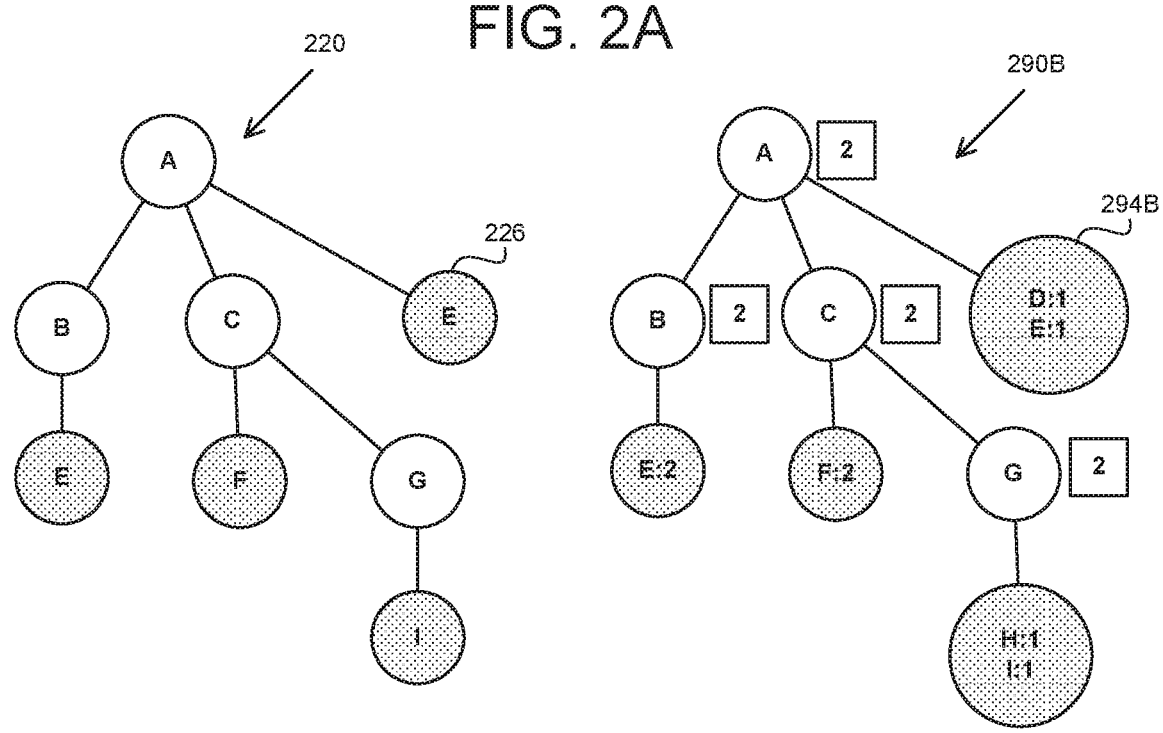

In FIG. 2B, a Graph 220 is observed and used to update Consensus Graph 290A to obtain Consensus Graph 290B. As can be seen, as the path A in Graph 220 has the value E (see Node 226), Consensus Graph 290B comprises note 294B which indicates that the path A was observed once with the value D (Graph 210) and once with the value E (Graph 220).

Figure 2C:
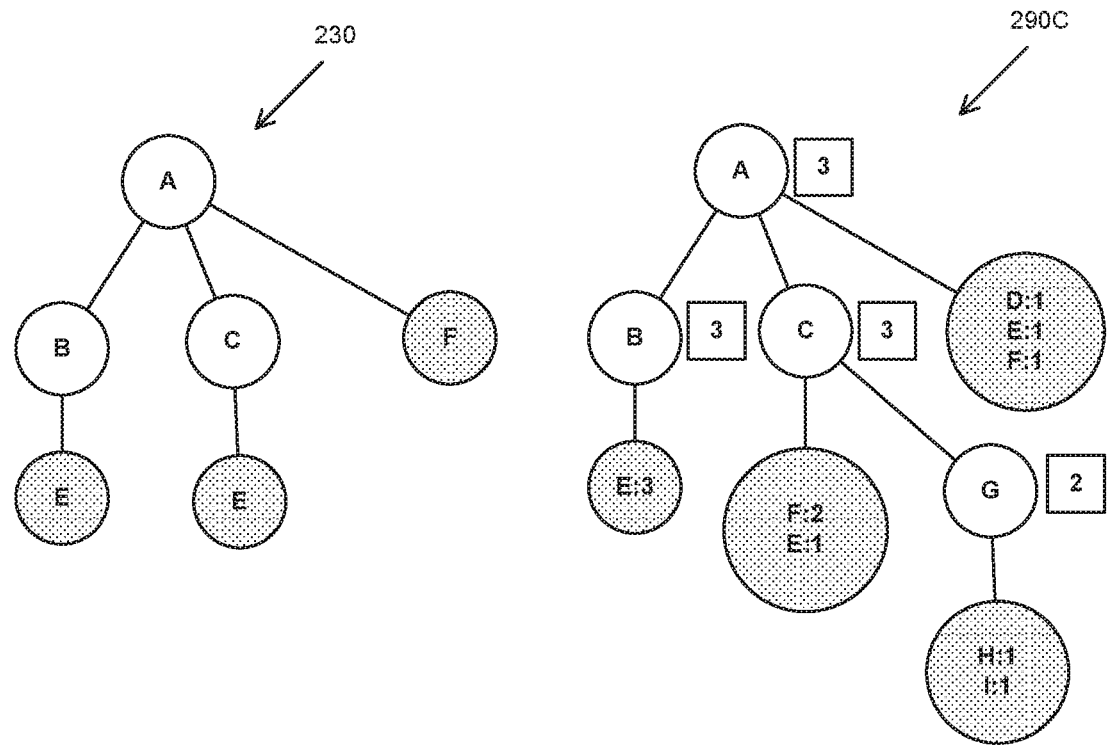

In FIG. 2C, a Graph 230 is observed and used to update Consensus Graph into 290C.

Figure 2D:
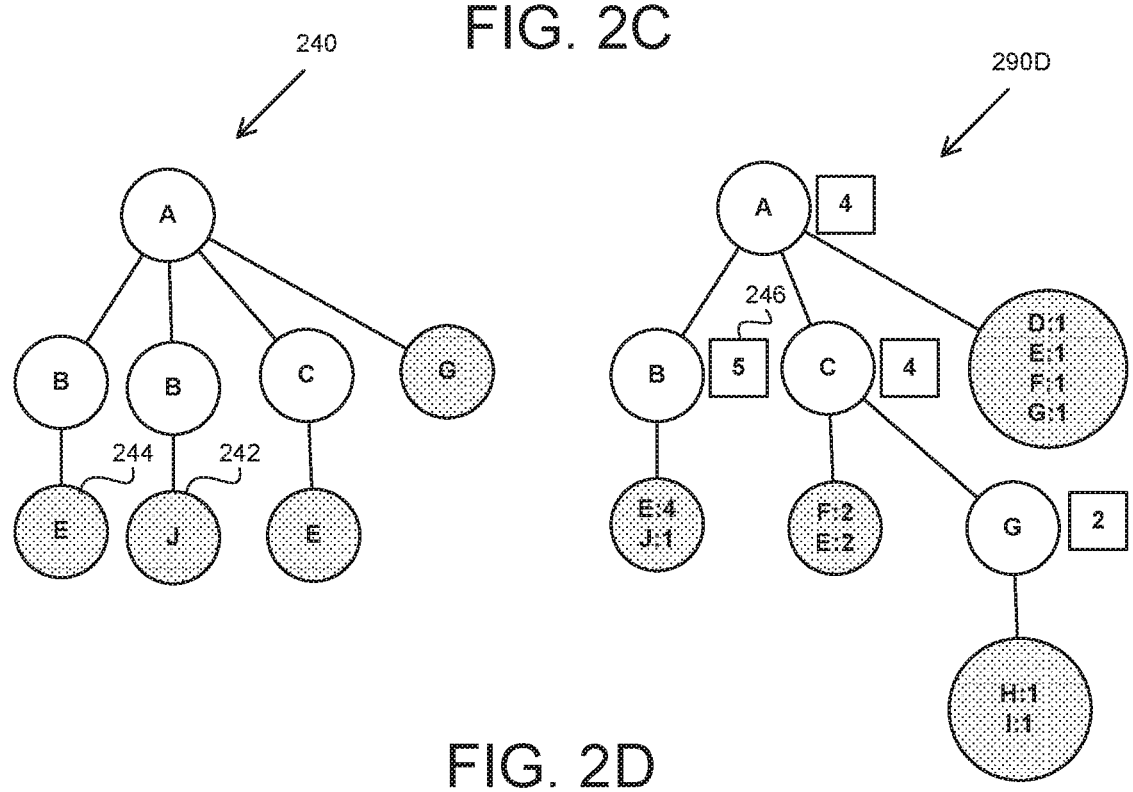

In FIG. 2D, a Graph 240 is observed and used to update Consensus Graph into 290D. In Graph 240, the path A-B appears twice, once with the value E (Node 244) and once with the value J (Node 242). Both values are observed, and therefore, Indication 246, is increased by two to indicate that this path was observed a total of five times. In some exemplary embodiments, Consensus Graph 290D may comprise data allowing to differentiate the number of times the feature is observed and the number of graph in which the feature was observed. Such information may be useful for understanding the importance or lack there of, of the fact that a specific path is not found in an examined graph (e.g., if the path appears rarely in graphs, then the fact that it does not appear in the examined graph does not mean the examined graph is considered an anomaly. Moreover, if the path rarely appears in graphs but when it appears it appears a plurality of times, such information may also be useful in understanding whether the examined graph deviates from a norm). In some exemplary embodiments, Consensus Graph 290D is characterized in having each occurrence of an SL feature at most once. As this is the case, the path A-B appears exactly once in Consensus Graph 290D.

Figure 2E:
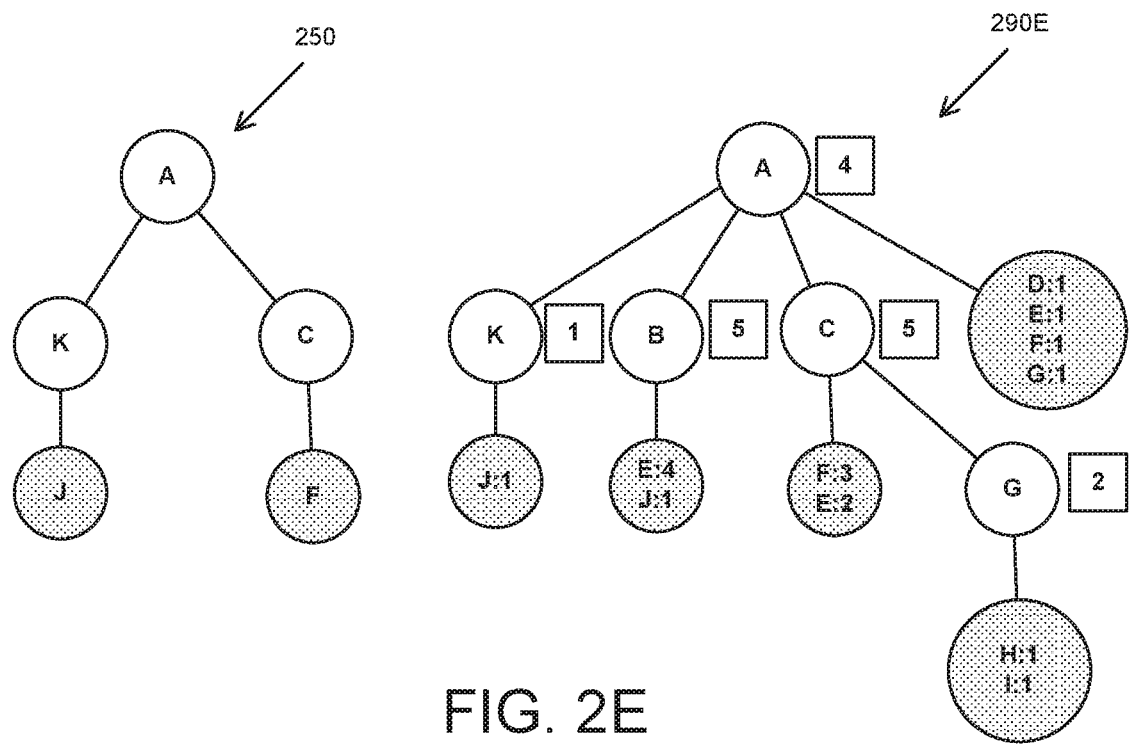

In FIG. 2E, a Graph 250 is observed and used to update Consensus Graph into 290E.

As can be appreciated from FIGS. 2A-2E, each graph may be traversed to detect its path. In accordance with the traversal of the graph, the consensus graph may also be traversed and updated to include each observed labeled node of the path and to update the terminal node if the indication and/or information relating to distribution of observed values.

In some exemplary embodiments, after the consensus graph is built or during the building thereof, a probabilistic model may be determined with respect to each feature in the consensus graph. Referring to Consensus Graph 290E, a probabilistic model may be determined with respect to each terminal node which is associated with a specific path.

Consensus Graph 290E provides that path A was observed four times, each time with a different value. Hence, a probabilistic model with respect to path A may not put an emphasis on the value of the feature (as the value observed was different every time) but rather on the existence of the path in the graph.

Consensus Graph 290E provides that path A-K was observed once. Hence, the probabilistic model may not put an emphasis on the existence of the path. However, as the value of the feature was always the same value, if the path exists, the probabilistic model may expect its value to be J.

Consensus Graph 290E provides that path A-B was observed five times, four times with the value E and once with the value J. Hence, the probabilistic model may put an emphasis on both the existence of the path and on the value which should be biased towards the value E. If information regarding the existence of the feature in a single data sample is provided, and as the value J was observed when the value E was observed (Graph 240), the probabilistic model may determine that each graph of the training data that included the path A-B, had the value E and hence would expect each graph that includes such a path to have at least the value E.

Consensus Graph 290E provides that the path A-C was observed five times, twice with the value E and three times with the value F. Hence, the probabilistic model may be biased slightly towards the value F over the value E and would expect every graph to include this path.

Consensus Graph 290E provides that path A-C-G was observed twice, each time with a different value (I, H). Hence, such a path may be expected to be found in roughly 40% (⅖) of the graphs being observed.

In some exemplary embodiments, the consensus graph may be pruned and reduced to remove data in which the variance is above a predetermined threshold. As an example, as the path A-K was observed only in a single sample, such a path may be trimmed from Consensus Graph 290E and discarded. As another example, as the value of path A is of low predictability (e.g., such features is characterized in relatively high entropy as it is different each time), the observed values may be omitted without removing the path itself. Additionally or alternatively, the feature itself may be pruned. In some exemplary embodiments, a feature may be considered as having low predictability based on entropy-related mass-concentration considerations, for example if its 5 most probable values cover less than 50% of the samples.

As can be appreciated, the consensus graph is a reference model which is stored using a graph. The model may hold expected distributions on sub-graphs and values. In some exemplary embodiments, features may also relate to Boolean predicates on the values (e.g., "all terminal values of a specific path are equal"). In such a case, the model holds Boolean rules on sub-graphs and values.

Upon receiving a graph to be examined, features and values may be extracted from the examined graph and compared to the distribution of values and Boolean rules that are stored in the model. Nodes, and sub-graphs may be assigned with an anomaly score that reflects the deviation of them from the normal behavior as reflected in the model. Anomaly score may be the probability to see a certain value in the training set (low probability=high anomaly), a p-value for estimated distributions, or the like.

Figure 3:
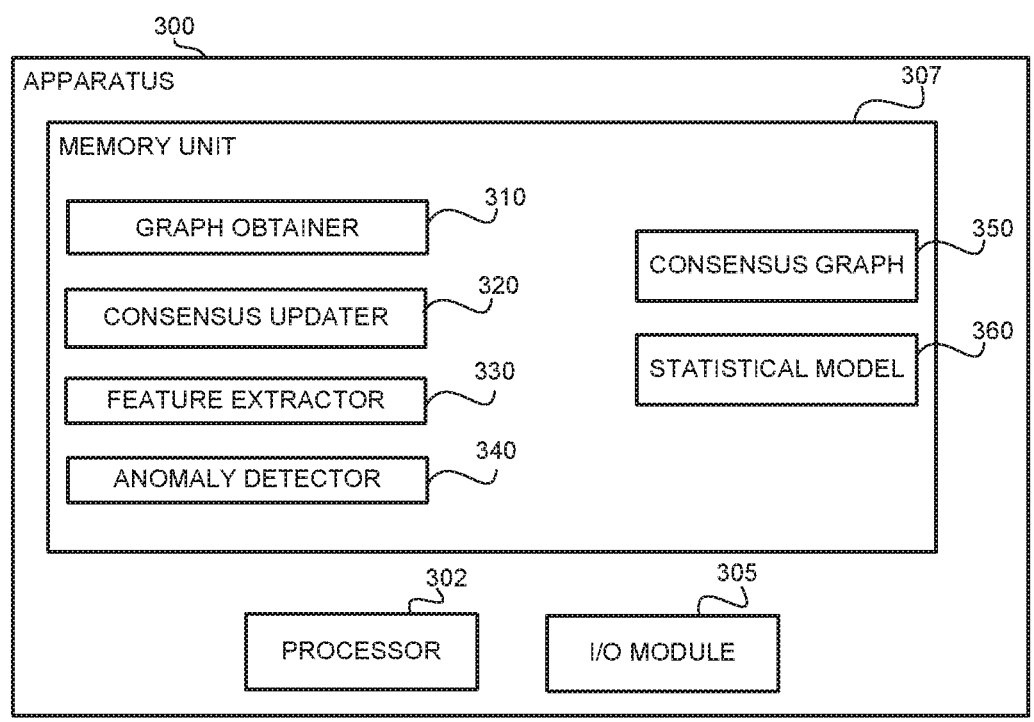
FIG. 3 shows a block diagram of an apparatus, in accordance with some exemplary embodiments of the disclosed subject matter.
Figure 4:
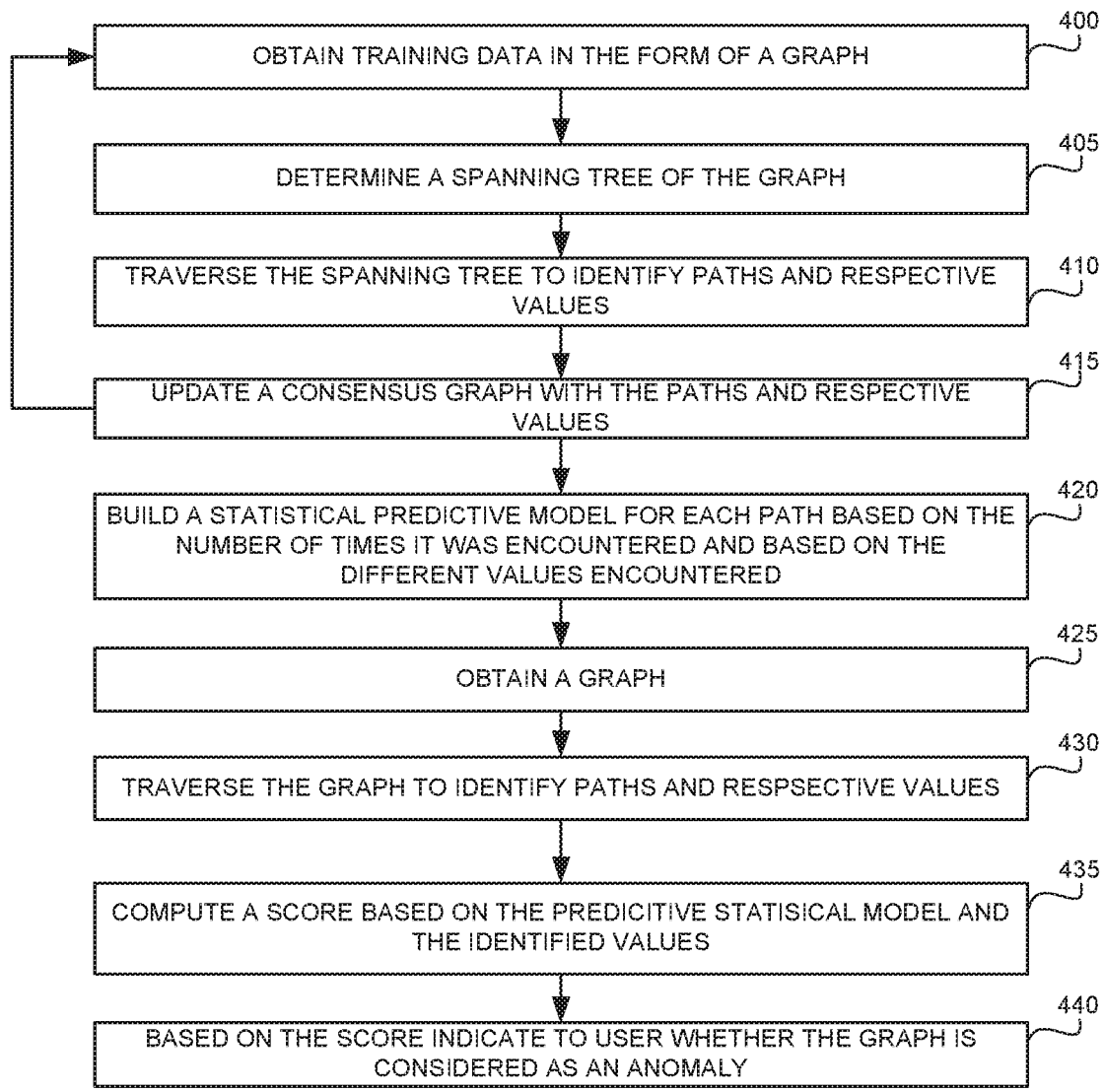
FIG. 4 shows a flowchart diagram of a method, in accordance with some exemplary embodiments of the disclosed subject matter.

Referring now to FIG. 3 showing a block diagram of components of an apparatus, in accordance with some exemplary embodiments of the disclosed subject matter. An Apparatus 300 may be a computerized apparatus adapted to perform methods such as depicted in FIGS. 1A, 1B, 4, and/or with relation to FIGS. 2A-2E.

In some exemplary embodiments, Apparatus 300 may comprise a Processor 302. Processor 302 may be a Central Processing Unit (CPU), a microprocessor, an electronic circuit, an Integrated Circuit (IC) or the like. Alternatively, Apparatus 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 302 may be utilized to perform computations required by Apparatus 300 or any of it subcomponents.

In some exemplary embodiments of the disclosed subject matter, Apparatus 300 may comprise an Input/Output (I/O) Module 305 such as a terminal, a display, a keyboard, an input device or the like to interact with the system, to invoke the system and to receive results. It will however be appreciated that the system can operate without human operation. The I/O Module 205 may be used to provide an interface to a user of the system, such as by providing output, visualized results, reports, or the like. The user may use I/O Module 205 to provide the training dataset, to bias the data, to modify rules, to select features or a super-set thereof from which Apparatus 300 may select the features, or the like.

In some exemplary embodiments, Apparatus 300 may comprise a Memory Unit 307. Memory Unit 307 may be persistent or volatile. For example, Memory Unit 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 307 may retain program code operative to cause Processor 302 to perform acts associated with any of the steps shown in FIGS. 1A, 1B and/or 4. Memory Unit may also be used to retain a Consensus Graph 350, such as illustrated in FIG. 2A-2E, a Statistical Model 360, which may or may not be based on Consensus Graph 350.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A Graph Obtainer 310 may be configured to obtain a graph. The graph obtained may be part of a corpus of data samples used in a training phase. Additionally or alternatively, the graph may be an examined graph to be compared with the training set.

A Consensus Updater 320 may be configured to build a Consensus Graph 350, such as illustrated in FIGS. 2A-2E. Consensus Updater 320 may be configured to update Consensus Graph 350 to refer to values of features extracted from a graph. Consensus Updater 320 may be used iteratively to modify Consensus Graph 350 based on a training dataset to determine a consensus graph that is to be used as a reference model.

A Feature Extractor 330 may be configured to determine whether a feature is present in a graph and extract its value. Feature Extractor 330 may be used by Consensus Updater 320 to extract features of the training data in order to update Consensus Graph 350. Additionally or alternatively, Feature Extractor 330 may be used with respect to an examined graph to determine whether it is abnormal in view of the Consensus Graph 350 and/or the predictions provided by Statistical Model 360.

An Anomaly Detector 340 may be configured to determine whether an examined graph is an anomaly. Anomaly Detector 340 may be configured to utilize Feature Extractor 330 to extract all features of the examined graph and their respective values and utilize Statistical Model 360 to determine a score for each such feature. The scores may be used to compute a similarity score for the examined graph itself. Based on the similarity score being below a predetermined threshold, the examined graph may be deemed to be not within the norm. Anomaly Detector 340 may be configured to provide output to a user indicating of its findings.

Referring now to FIG. 4 showing a flowchart diagram of a method, in accordance with some exemplary embodiments of the disclosed subject matter.

In Step 400, a graph is obtained to be used as training data.

In Step 405, a spanning tree of the graph is determined. In some exemplary embodiments, there may be a preference to use a specific node as a root node, such as based on its label. Such a preference may be useful in establishing consistency of the s spanning trees to be as similar as possible. In some exemplary embodiments, the preference may define an ordinal preference over nodes to be used as root nodes of the spanning tree.

In Step 410, the spanning tree may be traversed to identify paths thereof and respective values. It will be understood that other SL features may be used instead of or in addition to the SL feature of labeled paths.

In Step 415, a consensus graph may be updated with the paths and their respective values.

In case additional training samples exist, Steps 400-415 may be performed with respect to the additional samples.

In Step 420, after the consensus graph was built based on the training dataset, a statistical predictive model may be built for each path based on the number of times the path was encountered and based on the different values encountered. In some exemplary embodiments, the statistical model may be determined based on a pruned consensus graph that omits paths with relatively high entropy, rare paths (e.g., appearing in less than a predetermined portion of the samples, such as less than about 10%, or the like.

In some exemplary embodiments, Step 420 may be performed before a full consensus graph is built, such as be updated during the building of the consensus graph.

In Step 425, an examined graph is obtained.

In Step 430, the examined graph may be traversed to identify paths and respective values.

In Step 435, a score may be computed for each path and value to indicate its similarity to the prediction of the relevant statistical model.

In some exemplary embodiments, in case the path does not exist in the consensus graph, there may be no relevant statistical model and be considered as highly abnormal. In some cases, it may be determined whether the path never existed in the training data or if the path existed but was pruned, and the two cases may be treated differently (e.g., the pruned path may be considered as less abnormal than the non-existing path)

Based on the scores of all the extracted features (e.g., paths), a score may be computed for the examined graph to indicate how similar it is to a norm represented by the corpus of graphs of the training data.

In Step 440, based on the score, output may be provided to the user to indicate whether the graph is considered as an anomaly.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for automatically detecting anomalies in graphs, the method comprising:
    obtaining training data, the training data comprising a plurality of graphs, each defined by nodes and edges connecting between the nodes, wherein at least some of the nodes are labeled;
    determining, by a processor, a statistical model representing the plurality of graphs in accordance with the training data, wherein the statistical model is determined to represent features of three or more graphs of the plurality of graphs, wherein the statistical model is determined based on at least two structured and labeled features of the plurality of graphs, wherein each of the at least two structured and labeled features of the plurality of graphs is defined based on a connection between a plurality of nodes and based on at least a portion of the labels of the plurality of nodes;
    obtaining an examined graph;
    extracting values of the at least two structured and labeled features from the examined graph, wherein the values of the at least two structured and labeled features are extracted from at least two paths within the examined graph, wherein each of the at least two paths comprises at least three nodes, wherein each of the at least two structured and labeled features comprises one of the following features:
        a binary feature indicating existence of a labeled path,
        a binary feature indicating existence of a labeled, non-path, sub-tree topology, and
        a non-binary feature indicating a terminal value of a labeled path;
    computing a score for each of the at least two paths, wherein the score is computed based on a probability, according to the statistical model, of an appearance of the corresponding path in the plurality of graphs of the training data;
    automatically determining, by the processor, a similarity score for the examined graph, wherein the similarity score is indicative of a degree of difference between the examined graph and the training data, wherein said automatically determining the similarity score is based on the score for each of the at least two paths in the examined graph, wherein the similarity score being lesser than a threshold indicates a deviation of the examined graph from a norm of the plurality of graphs in the training data; and classifying the examined graph as an anomaly based on the similarity score being lesser than the threshold, the method further comprising displaying, in response to said classifying, the examined graph with visual indications indicating paths of the examined graph that deviate from the norm of the plurality of graphs.

2. The computer-implemented method of claim 1, wherein the plurality of graphs comprise respective trees.

3. The computer-implemented method of claim 1 further comprising, based on the training data, building a consensus graph retaining information relating to values of a structured and labeled feature in the plurality of graphs in the training data, wherein the consensus graph indicates in an explicit or symbolic manner each occurrence of the structured and labeled feature in the plurality of graphs.

4. The computer-implemented method of claim 1, wherein the values of the at least two structured and labeled features in the examined graph are associated with a motif present in the examined graph.

5. The computer-implemented method of claim 1, wherein the visual indication comprise a color indication, whereby visually indicating to a human user abnormal portions of the examined graph with respect to the plurality of graphs using colors.

6. A computerized apparatus for automatically detecting anomalies in graphs, having a processor, the processor being adapted to perform the steps of:

obtaining training data, the training data comprising a plurality of graphs, each defined by nodes and edges connecting between the nodes, wherein at least some of the nodes are labeled;

determining a statistical model representing the plurality of graphs in accordance with the training data, wherein the statistical model is determined to represent features of three or more graphs of the plurality of graphs, wherein the statistical model is determined based on at least two structured and labeled features of the plurality of graphs, wherein each of the at least two structured and labeled features of the plurality of graphs is defined based on a connection between a plurality of nodes and based on at least a portion of the labels of the plurality of nodes;

obtaining an examined graph;

extracting values of the at least two structured and labeled features from the examined graph, wherein the values of the at least two structured and labeled features are extracted from at least two paths within the examined graph, wherein each of the at least two paths comprises at least three nodes, wherein each of the at least two structured and labeled features comprises one of the following features:

a binary feature indicating existence of a labeled path, a binary feature indicating existence of a labeled, non-path, sub-tree topology, and a non-binary feature indicating a terminal value of a labeled path;

computing a score for each of the at least two paths, wherein the score is computed based on a probability, according to the statistical model, of an appearance of the corresponding path in the plurality of graphs of the training data;

automatically determining, by the processor, a similarity score for the examined graph, wherein the similarity score is indicative of a degree of difference between the examined graph and the training data, wherein said automatically determining the similarity score is based on the score for each of the at least two paths in the examined graph, wherein the similarity score being lesser than a threshold indicates a deviation of the examined graph from a norm of the plurality of graphs in the training data; and classifying the examined graph as an anomaly based on the similarity score being lesser than the threshold, wherein the processor is further adapted to perform the step of displaying, in response to said classifying, the examined graph with visual indications indicating paths of the examined graph that deviate from the norm of the plurality of graphs.

7. The computerized apparatus of claim 6, wherein the plurality of graphs comprise respective trees.

8. The computerized apparatus of claim 6, wherein the processor is further adapted to perform the step of: based on the training data, building a consensus graph retaining information relating to values of a structured and labeled feature in the plurality of graphs in the training data, wherein the consensus graph indicates each occurrence of the structured and labeled feature in the plurality of graphs.

9. The computerized apparatus of claim 6, wherein the values of the at least two structured and labeled features in the examined graph are associated with a motif present in the examined graph.

10. A computer program product comprising a non-transitory computer readable medium retaining program instructions, which instructions when read by a processor, cause the processor to perform a method comprising:

obtaining training data, the training data comprising a plurality of graphs, each defined by nodes and edges connecting between the nodes, wherein at least some of the nodes are labeled;

determining a statistical model representing the plurality of graphs in accordance with the training data, wherein the statistical model is determined to represent features of three or more graphs of the plurality of graphs, wherein the statistical model is determined based on at least two structured and labeled features of the plurality of graphs, wherein each of the at least two structured and labeled features of the plurality of graphs is defined based on a connection between a plurality of nodes and based on at least a portion of the labels of the plurality of nodes;

obtaining an examined graph;

extracting values of the at least two structured and labeled features from the examined graph, wherein the values of the at least two structured and labeled features are extracted from at least two paths within the examined graph, wherein each of the at least two paths comprises at least three nodes, wherein each of the at least two structured and labeled features comprises one of the following features:

a binary feature indicating existence of a labeled path, a binary feature indicating existence of a labeled, non-path, sub-tree topology, and a non-binary feature indicating a terminal value of a labeled path;

computing a score for each of the at least two paths, wherein the score is computed based on a probability, according to the statistical model, of an appearance of the corresponding path in the plurality of graphs of the training data;

automatically determining, by the processor, a similarity score for the examined graph, wherein the similarity score is indicative of a degree of the difference between the examined graph and the training data, wherein said automatically determining the similarity score is based on the score for each of the at least two paths in the examined graph, wherein the similarity score being lesser than a threshold indicates a deviation of the examined graph from a norm of the plurality of graphs in the training data; and classifying the examined graph as an anomaly based on the similarity score being lesser than the threshold, wherein the method further comprises displaying, in response to said classifying, the examined graph with visual indications indicating paths of the examined graph that deviate from the norm of the plurality of graphs.

* * * * *